United States Patent Office 2,883,351
Patented Apr. 21, 1959

2,883,351

PROCESS FOR CREAMING RUBBER LATICES AND CREAMING AGENT USED

Carl A. Uraneck and Durward F. Dodgen, Jr., Phillips, Tex., assignors to Phillips Petroleum Company, a corporation of Delaware No Drawing. Application September 2, 1954
Serial No. 453,962

16 Claims. (Cl. 260—17.5)

This invention relates to a composition of matter and a method for creaming a rubber latex.

In the separation of natural and synthetic rubber from latex, it is frequently desired that the latex be concentrated. Such concentration can be accomplished by what is known in the art as creaming. The latex is creamed by the addition of a small quantity of creaming agent such as an alginate, pectate, locust seed or carob bean gum, karaya gum, Irish moss and similar vegetable mucilages. Creaming results in separation of the latex into two layers, the upper of which contains the major portion of the rubber particles and the other layer contains most of the water-soluble constituents of the latex. Creaming agents heretofore employed are not entirely satisfactory. They are frequently fairly slow in their action and also do not give as high cream solids as desired.

We have found that an aqueous solution of a salt of an acrylic acid or an acrylic acid derivative polymer in admixture with a vegetable mucilage is a much more effective creaming agent for rubber latices than is the vegetable mucilage alone. We have also found that aqueous solutions of the salts of these acid polymers alone are ineffective creaming agents, i.e., they have little or no effect when used alone in natural and synthetic rubber latices.

An object of this invention is to provide an improved rubber latex creaming agent.

Another object of this invention is to provide an improved method of creaming a rubber latex.

Still other objects and advantages of this invention will be apparent to those skilled in the art upon reading this disclosure and the attached claims.

In accordance with this invention, an aqueous solution is prepared from the salts of homopolymers of acrylic acid or acrylic acid derivative or the copolymers of these polymerizable acids with conjugated dienes or mixtures of conjugated dienes with other copolymerizable compounds. The salt solution is admixed with a vegetable mucilage such as alginate, pectates, locust seed or carob bean gum, karaya gum, Irish moss, or the like and the admixture is used as a rapid and effective creaming agent for natural and synthetic rubber latices. The combination of the two types of materials, i. e., a water-soluble salt of an acrylic acid homopolymer or copolymer and a vegetable mucilage has been found to be a much more effective creaming agent than is the vegetable mucilage alone.

The polymers employed in the preparation of the latex creaming compositions of this invention are homopolymers of acrylic acid and various alpha and beta alkyl-substituted derivatives in which the alkyl group contains from one to eight carbon atoms, such as methacrylic acid, crotonic acid, alpha and beta ethyl-, propyl-, butyl-, hexyl-, and octylacrylic acids, phenylacrylic acids, i.e., atropic and cinnamic acids, and vinylacrylic acids. Also applicable are copolymers of these monomers with each other or with one or more copolymerizable monomers such as conjugated dienes, styrene, alpha-methyl-styrene, various alkyl-substituted styrenes, acrylonitrile, methacrylonitrile, acrylates such as methyl acrylate, ethyl acrylate and methyl methacrylate, vinyl chloride, vinylidene chloride, vinyl acetate, methyl vinyl ketone, methyl isopropenyl ketone, methyl vinyl ether, and the like. The preferred copolymerizable monomers are conjugated dienes or mixtures of conjugated dienes with each other or with polymerizable compounds. The conjugated dienes employed are preferably those which contain from four to six, inclusive, carbon atoms per molecule, but those containing more carbon atoms per molecule, e.g., eight, can be used. These compounds include 1,3-butadiene, isoprene, piperlene, methylpentadiene, 2,3-dimethyl-1,3-butadiene, chloroprene and others. Furthermore, various alkoxy, such as methoxy and ethoxy, and cyano derivatives of these conjugated dienes can be employed, i. e., 2-methoxybutadiene and 1-cyanobutadiene.

In the preparation of the acid polymer, the acidic monomer is generally employed in an amount in the range of 20 and 100 parts by weight per 100 parts total monomeric material. The remaining material, if any, is preferably a conjugated diene, a mixture of conjugated dienes or a conjugated diene and a copolymerizable material containing a single olefinic bond such as styrene. It is also preferred that the copolymerizable monomers other than the acidic monomer should be at least 50 weight percent conjugated diene. For example 60 weight parts acrylic acid, 30 weight parts 1,3-butadiene and 10 weight parts styrene as a copolymer is representative of our preferred copolymer. Other representative preferred species include 20:80 acrylic acid:butadiene; 30:50:20: methacrylic acid:butadiene:isoprene; 50:50 acrylic acid:methyacrylic acid; and 100 acrylic acid. These examples are representative of each type of our preferred species, it being understood that the acrylic acid or its derivative can be present in the polymer from 20 to 100 parts per 100 total parts of polymer and that the copolymerizable material can be any copolymerizable monomer which is not reactive with the acid radical.

These acid homopolymers or copolymers can be prepared by emulsion polymerization or any other well known polymerization method. Such polymers are well known in the art.

The acid polymer or copolymer can vary from liquid, to rubbery, to resinous and can be modified if desired. In general, those copolymers containing a large percentage of conjugated diene will be rubbery while those containing a larger percentage of acid monomer will be resinous. The viscosity of the polymer can be controlled by suitable modifying agents such as a mercaptan. Since these polymers are to be made water soluble, it will generally be more convenient to handle them in solid form, therefore, the more resinous polymers are frequently preferred. This also eliminates the use of any modifier or at least requires only a small amount of modifier, thus making for some savings in cost.

The latices to which the creaming agents of this invention are applicable are natural or synthetic rubber latices wherein the pH of the latex is at least 7. That is these synthetic latices are prepared by alkaline aqueous emulsion polymerization.

In effecting one form of such aqueous emulsion polymerization, particularly when a batch-type or semi-batch-type operation is carried out, the reactor is usually first charged with an aqueous medium which contains the desired emulsifying agent and the monomeric material. An activator solution and an oxidant are separately added to the reaction mixture and the reaction then proceeds. A preferred manner of adding these two latter constituents has been usually to have the activator solution incorporated in an aqueous medium prior to addition of the monomeric material, and then to add the oxidant as the last ingredient. It is also sometimes the practice to add portions of one or the other of the activator solution and oxidant intermittently, or continuously during the course of the reaction. If the operation is carried out continuously, streams of the various ingredients are admixed in somewhat the same order prior to their introduction into the polymerization zone.

The following recipes are given as examples of some of the types of polymerization recipes that can be used in accordance with our invention, and are presented as being typical of those to which our invention is applied.

RECIPE

| Diazothioether | Iron Pyrophosphate (Redox) | Polyalkylene Polyamine |
|---|---|---|
| Monomer. Water. Modifier. Emulsifier. Diazothioether. Electrolyte (optional). Alkali metal hydroxide (optional). Ferricyanide (optional). | Monomer. Water. Modifier. Emulsifier. Hydroperoxide. Sugar (optional). Alkali-metal pyrophosphate $FeSO_4 \cdot 7H_2O$. Electrolyte (optional). Alkali metal hydroxide (optional). | Monomer. Water. Modifier. Emulsifier. Hydroperoxide. Polyalkalene polyamine. Electrolyte (optional). Alkali metal hydroxide (optional). |

The emulsifying agents employed in alkaline emulsion polymerization systems include alkali metal alkyl aryl sulfonates such as sodium and potassium alkylbenzene and alkyltoluene sulfonate; sulfates of long-chain aliphatic alcohols such as sodium lauryl sulfates; quaternary ammonium salts such as cetyl trimethyl ammonium bromides and the like; the alkali metal and ammonium salts of fatty acids, such as sodium oleate, sodium sterate, sodium laurate, sodium myristate, sodium palmitate, the corresponding potassium salts and the like ammonium salts; the ammonium and alkali metal salts of rosin acids such as the ammonium, sodium and potassium salts of abietic acid, dihydroabietic acid, and tetrahydroabietic acid, and non ionic emulsifying agents such as the condensation products of mercaptan with ethylene oxide and the like.

While any modifying agent known to the art can be used without departing from the scope of this invention, the modifying agents most generally used are sulfur containing compounds such as mercaptans, organic sulfides, thio and di-thionic acids and salts, xanthogenic acids and salts, thiocarbonic acids and salts, and the like. However, the aryl and alkyl mercaptans are most generally used as modifiers in emulsion polymerization systems and we have found that tertiary $C_{12}$ to $C_{16}$ mercaptans are of particular value. The mercaptans used will generally contain 3–16 carbon atoms per molecule. Mixtures or blends of mercaptans are often used, the amount of mercaptan employed will be dependent upon the particular mercaptan or blend, the operating temperature, the monomeric materials employed, etc., as well as economic considerations. In general, the greater modification is obtained when operating at low temperatures and therefore a smaller amount of mercaptan is required at the lower temperatures. In general, where a rubbery material is desired, .01 to 3 parts of modifier per 100 parts of monomer will be used. However, larger amount of modifier can be used, say up to 20 when a liquid polymer is desired.

Many electrolytes are known in the art and the choice of particular electrolyte will be upon the temperature of polymerization and other polymerization conditions. These electrolytes are salts such as alkali metal salts, alkaline earth metal salts, and ammonium salts. Chlorides, nitrates and sulfates of these materials are most frequently preferred, particularly the chloride of sodium, potassium, calcium, magnesium, and ammonium. Highly soluble salts of organic acids of low molecular weight can also be used, such as salts of formic, acetic, propionic and butyric acids and especially the potassium salts.

Of the alkali metal hydroxides, which are applicable, the hydroxides of sodium and potassium are most frequently preferred.

Suitable hydroperoxides for use in iron pyrophosphate (redox) and polyalkylene polyamine recipes and other recipes calling for an oxygen-yielding material are preferably organic hydroperoxides having the formula $RR'R''COOH$ wherein each of $R$, $R'$, and $R''$ is an organic radical, or $R'R''$ together comprise a tetramethylene or pentamethylene group forming with the $R$—$COOH$ a cyclopentyl or cyclohexyl hydroperoxide. Each of $R$, $R'$ and $R''$ can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether groups, sulfur in similar groups (i.e., mercapto compounds and thioethers), and halogen compounds. Examples of such hydroperoxides include diisopropyl hydroperoxide [isopropyl(dimethyl)hydroperoxymethane], cumene hydroperoxide [phenyl(dimethyl)hydroperoxymethane], 1-methyl-1-hydroperoxycyclopentane, tetralin hydroperoxide, phenylcyclohexane hydroperoxide, octahydrophenanthrene hydroperoxide, diisopropylbenzene hydroperoxide [dimethyl(isopropylphenyl)hydroperoxymethane], methylethyl(ethoxyphenyl)hydroperoxymethane, methyldecyl(methylphenyl)hydroperoxymethane, dimethyldecyl-hydroperoxymethane, methyl(chlorophenyl)phenylhydroperoxymethane, and tertiary-butylisopropylbenzene hydroperoxide, dimethyl(tertiary-butylphenyl)hydroperoxymethane.

In case of a diazothioether recipe, preferably diazothioethers have the formula $R$—$N$=$N$=$S$—$R'$ where $R$ and $R'$ are aromatic groups containing substituents such as alkyl, chloro, nitro, methoxy, sulfonic acid group, and $R'$ can also be cycloalkyl, substituted cycloalkyl, aliphatic and substituted aliphatic, and the like. These compounds act both as initiators and as modifiers in a polymerization recipe and hence may be used as both catalysts and modifiers in the recipe. However, it is preferred to use a mercaptan modifier along with the diazothioether in the practice of our invention. It is often desirable to use a catalyst such as potassium or sodium ferricyanide in conjunction with the diazothioether, in an amount such as between 0.03 and 1.0 part by weight per 100 parts by weight of monomeric material. Examples of suitable diazothioethers include 2-(2,4-dimethylbenzenediazomercapto)naphthalene, 2-(4-methylbenzenediazomercapto)naphthalene (known in the art as MDN), 2 - (2-methylbenzenediazomercapto)naphthalene, 2-(2,5-dimethoxybenzenediazomercapto)naphthalene, 4-(2,5-dimethoxybenzenediazomercapto)toluene, 4-(2-naphthalenediazomercapto)anisole, 2 - (4 - acetylaminobenzenediazomercapto)naphthalene, 2-(benzenediazomercapto)-naphthalene, 2-(4-sulfobenzenediazomercapto)benzothiazole, 2-(1-naphthalenediazomercapto)naphthalene, 2-(4-chlorobenzenediazomercapto)naphthalene, 2-(5-quinolinediazomercapto)naphthalene, 2-(4-nitrobenzenediazomercapto)naphthalene, and the like.

The type and amount of diazothioether used in a particular polymerization recipe depends upon the result desired. In general, approximately 0.2 parts by weight of diazothioether per 100 parts of butadiene will give satisfactory promotion of the polymerization reaction although other proportions within the range of about 0.5 to about 5.0 parts by weight per 100 parts by weight of butadiene, can be used.

In the case of a polyalklene polyamine recipe, the activating agent, i.e., a polyalkylene polyamine is preferably a polyethylene polyamine or a trimethylene polyamine. Suitable polyethylene polyamines have the general formula $RNH(CHXCHXNH)_m(CHXCHX)_nNHR$, where $R$ contains not more than eight carbon atoms and is of the group consisting of hydrogen, alkyl, cycloalkyl, aromatic, olefinic, and cycloolefinic radicals, each X contains not more than three carbon atoms and is of the group consisting of hydrogen and aliphatic radicals, m is an integer between 0 and 8, inclusive, and n is an integer of the group consisting of 0 and 1 and is 1 when m is greater than 0. Each of the foregoing radicals (other than hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents; particularly useful non-hydrocarbon constituents include oxygen in the form of hydroxy and ether compounds, sulfur in similar compounds (i.e., mercapto compounds and thioethers), and halogen compounds. Examples of such polyethylene polyamines include ethylenediamine, hydrazine, diethylenetriamine, tetra-ethylenepentamine, di(methylethylene) triamine, N-(2-hydroxyethyl) - 1,2 - ethanediamine, N-phenylethylenediamine, N-cyclohexyl-N'-(2-aminoethyl)- 1,2-ethanediamine, N-(2-hydroxy-tertiary-butyl)-1,2-propanediamine, carbamates of the foregoing, and the like.

Those monomeric materials which are subject to alkaline emulsion polymerization are neutral toward the alkali and include conjugated dienes, styrene, alpha-methylstyrene, various alkyl-substituted styrenes, acrylonitrile, methacrylonitrile, acrylates such as methyl acrylate, ethylacrylate, and methyl methacrylate, vinyl chloride, vinylidene chloride, vinyl acetate, methyl vinyl ketone, methyl isopropenyl ketone, methyl vinyl ether, and the like. These monomeric material can be polymerized alone (homopolymer) or any one with one or more of the others (copolymers). The preferred monomers are conjugated dienes or conjugated dienes with other copolymerizable compounds. That is, such homopolymers and copolymers have found wide use in commercial application. The conjugated dienes employed are preferably those which contain from four to six, inclusive, carbon atoms per molecule, but those containing more carbon atoms per molecule, e.g., eight, can also be used. Examples of such compounds include 1,3-butadiene, isoprene, piperlene, methylpentadiene 2,3-dimethyl-1,3-butadiene, chloroprene, and others. Furthermore, various alkoxy such as methoxy and ethoxy and cyano derivatives of these conjugated dienes can also be employed, i.e., 2-methylbutadiene and 1-cyanobutadiene.

In addition to the above type monomer, those monomers containing at least one basic nitrogen group per molecule are polymerized in a basic aqueous emulsion. These monomers can be polymerized either alone or copolymerized with one or more of the above neutral type monomers. However, here again, the preferred (most widely used in commerce) polymer is a copolymer of a conjugated diene and a nitrogen base monomer. Such basic monomers are generally of the tertiary amine type, however, the primary and secondary amine types can be used. Of these compounds, those which are most frequently employed are pyridine and quinoline derivatives containing at least one vinylpyridine group. The term "vinylidene group" represents a

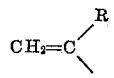

substituent where R is either hydrogen or a methyl group, i.e., the substituent is either a vinyl or an alpha-methylvinyl (isopropenyl) group. The vinylidene-substituted pyridene and quinoline compound which are most widely used are those having only one

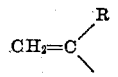

substituent and of these compounds, those belonging to the pyridine series are most frequently preferred. Various alkyl-substituted derivatives are also applicable but it is generally preferred that the total number of carbon atoms in the nuclear-substituted alkyl groups should not be greater than 12 and most frequently these alkyl groups are methyl and/or ethyl. Examples of such compounds are 2-vinylpyridine; 3-vinylpyridine; 4-vinylpyridine; 2,4,6-trimethyl-3-vinylpyridine; 3,4,5,6-tetramethyl-2-vinylpyridine; 3-ethyl-5-vinylpyridine; 2-methyl-5-vinylpyridine; 2,6-diethyl-4-vinylpyridine; 2-isopropyl-4-nonyl-5-vinylpyridine; 2-methyl-5-undecyl-6-vinylpyridine; 3 - dodecyl-2,4-divinylpyridine; 2,4-dimethyl-5,6-diphenyl-3-vinylpyridine; 3,5-di(alpha-methylvinyl)pyridine; similar mono and di substituted alkene, alkadiene and alkyne pyridines; and like quinolines. Other polymerizable compounds which contain basic nitrogen groups and which are also considered applicable include dialkylaminostyrenes, such as N,N-dimethylaminostyrene, diethylaminostyrene, 3-methyl-4-ethyl-5-aminostyrene, dipropylaminostyrene, methylpropylaminostyrene, and the corresponding dialkylamino-alpha-methylstyrenes, dialkylaminoethyl acrylates such as dimethylaminoethyl acrylate, diethylaminoethyl acrylate, dipropylaminoethyl acrylate, methylethylaminoethyl acrylate, etc., and the corresponding dialkylaminoethyl methacrylates, e.g., dimethylaminoethyl methacrylate, diethylaminoethyl methacrylate, and the like. In general, the alkyl group will be attached to the nitrogen but one or both can be attached to the carbon ring. Other basic polymers which are applicable to our invention include copolymers of vinylpyrrole, vinylmorpholine, alkenylamines, vinylpyrazine, vinylpyridazine, and vinylpiperazine, as well as other vinyl heterocyclic nitrogen containing compounds.

For the acrylic acid derivative to be effective in the creaming composition, the carboxy groups in the polymer must be converted to a salt by treatment with a base, i.e., it is the polymeric salt which is the effective creaming agent component. When the polymer is not water soluble, it is converted to a soluble form by treatment with an alkali metal hydroxide, ammonia or an amine. An aqueous solution of the polymer salt is then mixed with a vegetable mucilage such as ammonium alginate, the concentration of the creaming solution is adjusted to the desired level, and it is ready for addition to a rubber latex. There are instances where the polymer is water-soluble and in such cases it is not necessary to convert it to the salt first. For example polyacrylic acid is water-soluble and in this case an aqueous solution can be prepared and mixed with the alginate. However, for this solution to be a satisfactory creaming agent, a base, preferably an amine such as triethylamine, must be present to convert the carboxy groups to a salt. The amine can be added either to the rubber latex or to the creaming solution.

The vegetable mucilage and the polymeric salt will generally be prepared as an aqueous solution comprising 10 to 90 parts by weight of the polymeric salt per 100 parts polymeric salt and vegetable mucilage. A base material as hereinafter mentioned can be present in this solution. However, it is the polymeric salt plus the vegetable mucilage which serves as the creaming agent. A sufficient amount of solution will be added to the latex to provide 0.5 to 10 parts of the creaming agent per hundred parts of rubber in the latex. We have found that 1 to 4 parts of the prepared creaming agent per 100 parts rubber gives excellent results and therefore is our preferred range of creaming agent per 100 parts of rubber.

While an aqueous salt solution of the acid polymer or copolymer in admixture with a vegetable mucilage is a satisfactory latex creaming agent, frequently improved results can be obtained by including in the system 1 to 10 parts of a base material per 100 parts of rubber. The base material most frequently used in such systems are materials such as trimethylamine, triethylamine, tripropylamine, tetramethylammonium hydroxide, tetraethylammonium hydroxide, guanidine, and the like. While the amine bases are preferred, other bases such as alkali metal, alkaline earth metal and ammonium hydroxides can be use. In any event, the creaming solutions of this invention are employed in latices which have a pH of 7.0 or above.

Of the polymeric materials which are applicable in the creaming solution of this invention, the copolymers of a conjugated diene and acrylic or methacrylic acid are readily available commercially or are easily prepared. These copolymers readily form a water soluble salt with an alkali metal hydroxide. Ammonium alginate is a well known and readily available creaming agent. In most of the following examples which are illustrative of the advantages of this invention, we will use an alkaline salt of 70/30 butadiene/acrylic acid copolymer in admixture with ammonium alginate as the creaming solution. By using only the one polymer and the one alginate, the effect of varying the ratio of the ingredients and neutralizing alkali is better shown. However, it should be understood that any of the polymeric materials disclosed neutralized with the base materials disclosed in admixture with the vegetable mucilage creaming agents will give improved creaming results over the vegetable mucilage alone. We have also used an alkaline butadiene/styrene rubber latex to illustrate this invention. However, our creaming agents are operable in any latex wherein the pH is at least 7. In the following example all parts are parts by weight unless otherwise specified. Percent solids refers to hydrocarbon latex solids.

*Example I*

A 70/30 butadiene-acrylic acid copolymer was converted to the potassium salt by treatment with KOH and the resulting aqueous solution was mixed in different proportions with an aqueous solution of ammonium alginate. The several solutions were used as creaming agents for an alkaline butadiene/styrene rubber latex. Control runs were made using aqueous solutions of ammonium alginate alone and the potassium salt of the butadiene/acrylic acid copolymer alone as creaming agents. In each case the quantity of solution added was sufficient to give two parts of creaming agent per 100 parts rubber. Triethylamine (two parts per 100 parts rubber) was added to the latex in each case. The following results were obtained:

| Creaming Agent | Latex solids, percent | Cream Solids, percent in 18 hours | Change in solids in 18 hours, percent |
| --- | --- | --- | --- |
| 75/25 ammonium alginate-K butadiene-acrylate | 22 | 41 | 19 |
| 50/50 ammonium alginate-K butadiene-acrylate | 22 | 43 | 21 |
| 25/75 ammonium alginate-K butadiene-acrylate | 22 | 40 | 18 |
| 100 ammonium alginate | 22 | 29 | 7 |
| 100 K butadiene-acrylate | 22 | 22 | 0 |

From the above data it can be seen that the ratio of alginate to polymer can vary over a wide range and still obtain good creaming results. The alginate alone had some effect, the potassium butadiene-acrylate alone was ineffective but the combination of alginate and copolymer was two to three times as effective as the alginate alone. This clearly demonstrates a synergistic effect in the combined action of the ingredients of the creaming agent.

*Example II*

A potassium butadiene-acrylate solution was prepared from a 70/30 butadiene/acrylic acid copolymer in the same manner described in Example I. Various 50/50 weight mixtures of ammonium alginate and potassium butadiene-acrylate were prepared with the concentration of the solution being adjusted to different levels. These solutions were employed in variable quantities as creaming agents for an alkaline butadiene/styrene rubber latex. Triethylamine was added to the latex in each run. The following table shows the amount of amine and creaming agent added, latex solids before and after introduction of the additives, and the results of creaming.

| Run No. | Triethylamine, P.h.r.[1] | 50/50 NH₄ alginate-K butadiene-acrylate, p.h.r.[1] | Latex Solids, Percent | Cream Solids, Percent in 18 hours | Change in Solids in 18 hours, Percent |
| --- | --- | --- | --- | --- | --- |
| 1 | 2 | 2.0 | 20 | 36 | 16 |
| 2 | 2 | 4.0 | 10 | 21 | 11 |
| 3 | 2 | 2.0 | 20 | 34 | 14 |
| 4 | 4 | 2.0 | 20 | 38 | 18 |
| 5 | 4 | 1.0 | 27 | 45 | 18 |
| 6 | 2 | 4.0 | 10 | 26 | 16 |
| 7 | 4 | 4.0 | 10 | 26 | 16 |

[1] Parts per 100 parts rubber (by weight).

The above data shows the effect of varying the parts of creaming agent per 100 parts or rubber. Excellent results were obtained with 1 to 4 p.h.r. of the creaming agent. For economical reasons, it is desirable to use as little creaming agent as possible so our preferred range is 1 to 4 p.h.r. However, as has been stated more or less can be used but will generally be not less than 0.5 nor more than 10 p.h.r.

*Example III*

A 70/30 butadiene/acrylic acid copolymer was treated with an aqueous solution of morpholine to convert the copolymer to the morpholinium salt (designated as morpholinium butadiene-acrylate). The aqueous solution of this salt was employed in a 50/50 weight mixture with ammonium alginate as a creaming agent for an alkaline butadiene/styrene rubber latex. Runs were made with and without triethylamine in the latex. The morpholinium butadiene-acrylate was used alone as a control. Reference can be made to Example I for ammonium alginate control. Results were as follows:

| Run No. | Triethylamine, p.h.r. | Creaming Agent, p.h.r. | Latex Solids, Percent | Cream Solids, Percent in 18 hours | Change in Solids in 18 hours, Percent |
| --- | --- | --- | --- | --- | --- |
| 1 | 2 | 2.0 | 22 | 34 | 12 |
| 2 | 0 | 2.0 | 22 | 37 | 15 |
| Control | 0 | 2.0 | 22 | 22 | 0 |

The above data show that a basic salt of butadiene acrylic acid copolymer with morpholine is operable similar to the alkali metal salt; and further demonstrates the synergistic action of the creaming agents of the invention.

*Example IV*

An aqueous solution of the ammonium salt of a 70/30 butadiene/acrylic acid copolymer was prepared and solution was employed in a 50/50 weight mixture with ammonium alginate as a creaming agent for an alkaline butadiene/styrene rubber latex. Runs were made with and without triethylamine in the latex. The ammonium salt (designated as ammonium butadiene-acrylate) was used alone as a control. Reference may be made to Example I for an ammonium alginate control. Results were as follows:

| Run No. | Triethylamine, p.h.r. | Creaming Agent, p.h.r. | Latex Solids, Percent | Cream Solids, Percent in 18 hours | Change in Solids in 18 hours, Percent |
| --- | --- | --- | --- | --- | --- |
| 1 | 2 | 2.0 | 22 | 36 | 14 |
| 2 | 0 | 2.0 | 22 | 33 | 11 |
| Control | 0 | 2.0 | 22 | 22 | 0 |

This example should be compared with Examples I and III to see the effect of different types of acid copolymer salts.

Example V

Aqueous solutions of ammonium alginate, ammonium polyacrylate and triethylammonium butadiene-acrylate were prepared, mixed in different proportions, and the mixtures used as creaming agents for an alkaline butadiene/styrene rubber latex. In each run four parts of triethylamine per 100 parts rubber was present. The proportions of ingredients in each run were as follows:

(1) 50/25/25 ammonium alginate-ammonium polyacrylate-triethylammonium butadiene-acrylate
(2) 25/50/25 ammonium alginate-ammonium polyarcylate-triethylammonium butadiene-acrylate
(3) 25/25/50 ammonium alginate-ammonium polyacrylate-triethylammonium butadiene-acrylate The following results were obtained:

| Run No. | Creaming Agent, p.h.r. | Latex Solids, Percent | Cream Solids, Percent in 18 hours | Change in Solids in 18 hours, Percent |
|---|---|---|---|---|
| 1 | 1.0 | 27 | 50 | 23 |
| 2 | 1.0 | 27 | 49 | 22 |
| 3 | 1.0 | 27 | 52 | 25 |

From the above data it can be seen that the alginated/conjugated diene/polyacrylate ratio can vary over a rather wide range without materially effecting the creaming ability of the solution.

Example VI

Aqueous solutions of ammonium alginate and polyacrylic acid were blended in proportions such that the mixture contained equal parts by weight of the two ingredients. Three runs were made in which this mixture was used as a creaming agent for an alkaline butadiene/styrene rubber latex. In two of the runs triethylamine was present in the rubber latex while in a third none was added. The results were as follows:

| Run No. | Triethylamine, p.h.r. | Creaming Agent, p.h.r. | Latex Solids, Percent | Creamed Solids, Percent in 18 hours | Change in Solids in 18 hours, Percent |
|---|---|---|---|---|---|
| 1 | 0 | 2.0 | 22 | 22 | 0 |
| 2 | 2 | 1.0 | 27 | 43 | 16 |
| 3 | 4 | 1.0 | 27 | 43 | 16 |

No creaming was observed in the run made without triethylamine. The amine was apparently sufficiently active to convert at least a portion of the free acid groups in the polyacrylic acid to the amine salt, thereby rendering it active as a creaming agent.

The above example shows that the acid should be at least partially neutralized to be effective. It also shows that the acrylic acid polymer is effective and the conjugated diene is not required.

Example VII

An aqueous solution of triethylammonium butadiene-acrylate was prepared by treating a 70/30 butadiene/acrylic acid copolymer with an aqueous solution of triethylamine. This solution was mixed with an ammonium alginate solution to give a mixture which contained equal parts by weight of the two ingredients. The ammonium alginate-triethylammonium butadiene acrylate solution thus prepared was used as a creaming agent for an alkaline butadiene/styrene rubber latex. Five runs were made, three of which contained triethylamine added to the latex. The following results were obtained.

| Run No. | Triethylamine, p.h.r. | Creaming Agent, p.h.r. | Latex Solids, Percent | Cream Solids, Percent in 18 hours | Change in Solids in 18 hours, Percent |
|---|---|---|---|---|---|
| 1 | 2 | 2.0 | 22 | 33 | 11 |
| 2 | 0 | 2.0 | 22 | 34 | 12 |
| 3 | 0 | 2.0 | 22 | 37 | 15 |
| 4 | 4 | 2.0 | 22 | 36 | 14 |
| 5 | 2 | 1.0 | 27 | 43 | 16 |

By comparing these results with the data in Example VI, it can be seen that the triethylamine is particularly advantageous when the polyacrylate is not previously neutralized.

Example VIII

Creaming agents were prepared by blending aqueous solutions of ammonium alginate and ammonium polyacrylate and using the resulting mixture in an alkaline butadiene/styrene rubber latex. Results were as follows:

| Run No. | Triethylamine, p.h.r. | Creaming Agent, p.h.r. | Latex Solids, Percent | Cream Solids, Percent in 18 hours | Change in Solids in 18 hours, Percent |
|---|---|---|---|---|---|
| 1 | 0 | [1] 1.25 | 22 | 36 | 14 |
| 2 | 2.0 | [2] 0.625 | 27 | 51 | 24 |

[1] 80/20 ammonium alginate-ammonium polyacrylate.
[2] 83/17 ammonium alginate-ammonium polyacrylate.

This example should be compared with Example VI. In both cases a polyacrylic acid is used as the polymeric material, but in this example, the polyacrylic acid is first neutralized. Also in this example, considerable less polyacrylate is used yet comparable results are obtained.

Example IX

Tetraethylammonium butadiene-acrylate was obtained in aqueous solutions by treatment of a 70/30 butadiene/acrylic acid copolymer with an aqueous solution of tetraethylammonium hydroxide. A 50/50 weight mixture, in aqueous solution, of ammonium alginate with tetraethylammonium butadiene-acrylate was prepared and used as a creaming agent for an alkaline butadiene/styrene rubber latex. No triethylamine was present in the rubber latex.

| Creaming Agent, p.h.r. | Latex Solids, Percent | Cream Solids, Percent 18 hours | Change in Solids in 18 hours, Percent |
|---|---|---|---|
| 2.0 | 22 | 37 | 15 |

This example is given to show the effect of neutralizing with a hydroxide rather than an amine.

Example X

The following materials were tried as creaming agents in an alkaline butadiene/styrene rubber latex:

(1) 50/50 polyacrylic acid-potassium butadiene-acrylate.
(2) 80/20 potassium butadiene-acrylate-ammonium polyacrylate.
(3) 80/20 triethylammonium butadiene-acrylate-ammonium polyacrylate.
(4) 50/50 polyacrylic acid-triethylammonium butadiene-acrylate.
(5) 83/17 triethylammonium butadiene-acrylate-ammonium polyacrylate.
(6) 83/17 potassium butadiene-acrylate-ammonium polyacrylate.

| Polymer | Triethyl-amine, p.h.r. | Creaming Agent, p.h.r. | Latex Solids, Percent | Cream Solids, Percent in 18 hours | Change in Solids in 18 hours, Percent |
|---|---|---|---|---|---|
| (1) | 4 | 1.0 | 27 | 27 | 0 |
| (2) | 0 | 1.25 | 22 | 22 | 0 |
| (3) | 0 | 1.25 | 22 | 22 | 0 |
| (4) | 2 | 1.0 | 27 | 27 | 0 |
| (5) | 2 | 0.625 | 27 | 27 | 0 |
| (6) | 2 | 0.625 | 27 | 27 | 0 |

The above examples show that these polymers are not creaming agents in themselves.

In our examples, the creaming agent has been added as a solution. In creaming practice, it has been found more convenient to put the creaming agent in solution and add the solution to the latex. However, we are not limited to any particular method of adding the creaming agent.

The 70/30 copolymers are prepared by polymerizing a monomer charge comprising 70 weight parts of butadiene and 30 weight parts acrylic acid in an emulsion polymerization recipe. It will be understood by those skilled in the art that the resulting polymer will not neecssarily contain these two monomers in this exact ratio.

We claim:

1. A process for creaming an alkaline rubber latex which comprises forming an aqueous solution of soluble alginate and an alkaline salt of a polymeric material comprising a monomer selected from the group consisting of acrylic acid, alpha, and beta alkyl-substituted acrylic acid wherein the alkyl group contains 1 to 8 carbon atoms, said salt being the reaction product of said polymeric material and a base selected from the group consisting of amines, ammonia and alkali metal hydroxides the solute in solution being 10 to 90 weight percent polymer and the balance soluble alginate; adding sufficient amount of said solution to said latex to provide 0.5 to 10 weight parts solute per 100 parts of rubber; and stirring solution and latex until the latex is creamed.

2. The process of claim 1 wherein the latex is a natural rubber latex.

3. The process of claim 1 wherein the latex is an alkaline emulsion polymerization latex.

4. The process of claim 1 wherein the aqueous solution of soluble alginate and polymeric material is added to said latex in an amount to provide 1 to 4 weight parts per 100 parts of rubber.

5. The process of claim 4 wherein the soluble alignate is ammonium alginate.

6. The process of claim 5 wherein the polymeric salt is ammonium polyacrylate.

7. The process of claim 5 wherein the polymeric salt is triethyl-ammonium butadiene-acrylate and wherein the acrylate comprises at least 20 weight percent of the copolymer.

8. The process of claim 5 wherein the polymeric salt is tetraethyl-ammonium butadiene-acrylate.

9. The process of claim 5 wherein the polymeric salt is potassium butadiene-acrylate.

10. The process of claim 5 wherein the polymeric salt is morpholinium butadiene-acrylate.

11. A process for creaming an alkaline rubber latex which comprises forming an aqueous solution of ammonium alginate and a polymeric material comprising at least 20 weight percent of a monomer selected from the group consisting of acrylic acid, alpha, and beta alkyl-substituted acrylic acid wherein the alkyl group contains 1 to 8 carbon atoms, the solute in said solution being 10 to 90 weight percent polymer and the balance ammonium alginate; adding said solution to said latex in the presence of sufficient base said salt being the reaction product of said polymeric material and a base selected from the group consisting of amines, ammonia and alkali metal hydroxides to neutralize at least a part of the acid radicals in said polymer, said solution being in sufficient amount to provide 1 to 4 weight parts of solute per 100 parts of rubber; and mixing said solution and said latex until the latex is creamed.

12. A creaming agent comprising an aqueous solution of a mixture of an alginate and a soluble salt of a polymeric material comprising at least 20 weight percent of a monomer selected from the group consisting of acrylic acid, alpha and beta alkyl-substituted acrylic acid wherein the alkyl group contains 1 to 8 carbon atoms.

13. The creaming agent of claim 12 wherein the alginate is ammonium alginate and the polymeric salt is ammonium polyacrylate.

14. The creaming agent of claim 12 wherein the alginate is ammonium alginate and the polymeric salt is triethylammonium butadiene-acrylate.

15. The creaming agent of claim 12 wherein the alginate is ammonium alginate and the polymeric salt is tetraethylammonium butadiene-acrylate.

16. The creaming agent of claim 12 wherein the alginate is ammonium alginate and the polymeric salt is potassium butadiene-acrylate.

References Cited in the file of this patent

UNITED STATES PATENTS

| 1,976,679 | Fikentscher et al. | Oct. 9, 1934 |
| 2,138,073 | Schweitzer | Nov. 29, 1938 |
| 2,317,328 | Kinney | Apr. 20, 1943 |
| 2,365,020 | Stillwell | Dec. 12, 1944 |
| 2,423,766 | Freeman | July 8, 1947 |
| 2,446,107 | Rumbold | July 27, 1948 |